United States Patent  (10) Patent No.: US 8,010,623 B1
Fitch et al.  (45) Date of Patent: Aug. 30, 2011

(54) METHOD AND SYSTEM FOR LOCALIZED SHORT-TERM BROADCASTS

(75) Inventors: Todd Matthew Fitch, Santa Clara, CA (US); Thomas A. Frasher, Sunnyvale, CA (US); Elliot M. Lynde, Verona, WI (US)

(73) Assignee: Intuit Inc., Mountian View, CA (US)

( * ) Notice: Subject to any disclaimer, the term of this patent is extended or adjusted under 35 U.S.C. 154(b) by 241 days.

(21) Appl. No.: 12/023,645

(22) Filed: Jan. 31, 2008

(51) Int. Cl.
G06F 15/16 (2006.01)
G06F 15/167 (2006.01)

(52) U.S. Cl. ........ 709/217; 709/200; 709/203; 709/218; 709/219; 709/231; 709/232

(58) Field of Classification Search .................. 709/200, 709/203, 217, 218, 219, 231, 232
See application file for complete search history.

(56) References Cited

U.S. PATENT DOCUMENTS

| | | | | |
|---|---|---|---|---|
| 7,263,367 | B1* | 8/2007 | Sabot | 455/456.1 |
| 2006/0173701 | A1* | 8/2006 | Gurvey | 705/1 |
| 2007/0022447 | A1* | 1/2007 | Arseneau et al. | 725/74 |
| 2007/0117553 | A1* | 5/2007 | Arnos | 455/414.4 |
| 2007/0155307 | A1* | 7/2007 | Ng et al. | 455/3.01 |
| 2008/0261526 | A1* | 10/2008 | Suresh | 455/41.2 |

* cited by examiner

*Primary Examiner* — Alina N Boutah
*Assistant Examiner* — Clarence John
(74) *Attorney, Agent, or Firm* — Osha • Liang LLP

(57) ABSTRACT

The invention relates to a method for using a multimedia service associated with a venue. The method includes steps of obtaining a pre-approved activation code associated with the venue, activating the multimedia service associated with the venue using the pre-approved activation code and an identification of a multimedia device, requesting the multimedia service using the multimedia device, and receiving the multimedia service using the multimedia device within a pre-determined range from a pre-determined locality of the venue, wherein the request is authenticated based on a locality of the multimedia device being within the pre-determined range from the pre-determined locality of the venue.

13 Claims, 6 Drawing Sheets

METHOD AND SYSTEM FOR LOCALIZED SHORT-TERM BROADCASTS

BACKGROUND

In many situations, a multimedia service may be provided as a contiguous delivery of information at a designated location. The provided multimedia service (e.g., access to an event venue) may be purchased for one time use at the designated location (e.g., the location of the venue). The delivered information may include sequential instances that are preferably received in the same sequence as arranged (or configured) in the contiguous delivery. Patrons for the multimedia service may be required to be physically bound to the designated location during such contiguous delivery, as even a short period of absence may render the received service less desirable because the missed portion of the sequential instances. Examples of such multimedia services may include watching a motion picture at a theater, watching games at a sports venue, participating in or viewing an event in an event hall, etc.

An exemplary scenario follows. You are at the motion picture theater watching the newest blockbuster. The movie couldn't be better but there's a problem; you need to go to the bathroom. At first you hold it, not wanting to get up and miss a second of the relatively expensive entertainment. Eventually you can't wait any longer; so you get up and run to the bathroom. You come back and ask your friends what you missed.

Next time, the motion picture is slightly shorter in length and you haven't had anything to drink all day; so bathroom breaks won't be a problem. Nevertheless, you can't wait to get to the motion picture theatre and eat some movie-style popcorn. You've been thinking about it all day long. It turns out that one of your buddies is late to pick you up and you arrive at the theater just in time to get to see the movie, no previews, no time to stand in line for popcorn. As excited as you were about getting the popcorn, you are also very excited about seeing the entire motion picture. Nevertheless, you get up and purchase some popcorn as quickly as possible. Just like before, you ask your friend what you missed.

SUMMARY

In general, in one aspect, the invention relates to a method for using a multimedia service associated with a venue. The method includes steps of obtaining a pre-approved activation code associated with the venue, activating the multimedia service associated with the venue using the pre-approved activation code and an identification of a multimedia device, requesting the multimedia service using the multimedia device, and receiving the multimedia service using the multimedia device within a pre-determined range from a pre-determined locality of the venue, where the request is authenticated based on a locality of the multimedia device being within the pre-determined range from the pre-determined locality of the venue.

In general, in one aspect, the invention relates to a method for authenticating a request for a multimedia service associated with a venue. The method includes steps of receiving a request for the multimedia service, obtaining locality information identifying a pre-approved activation code and locality of a multimedia device, authenticating the request based on the pre-approved activation code and the locality of the multimedia device being within a pre-determined range from a pre-determined locality of the venue, and approving transmission of the multimedia service to the multimedia device within the pre-determined range from the pre-determined locality of the venue.

In general, in one aspect, the invention relates to a system for using a multimedia service associated with a venue. The system includes a multimedia device for requesting and receiving the multimedia service, a multimedia server for providing the multimedia service to the multimedia device based on an identification of the venue within a pre-determined range from a pre-determined locality of the venue, a verification server for activating the multimedia service based on a pre-approved activation code associated with the venue and an identification of the multimedia device and for transmitting the identification of the multimedia device associated with the identification of the venue based on the pre-approved activation code to the multimedia server, a positioning module for determining a locality of the multimedia device, and an authentication module for authenticating the request based on the locality of the multimedia device being within the pre-determined range from the pre-determined locality of the venue.

In general, in one aspect, the invention relates to a system for authenticating a request for a multimedia service associated with a venue. The system includes a positioning module for determining locality information identifying a pre-approved activation code and locality of a multimedia device, and an authenticating module for authenticating the request based on the pre-approved activation code and the locality of the multimedia device being within a pre-determined range from a pre-determined locality of the venue and for approving transmission of the multimedia service to the multimedia device within the pre-determined range from the pre-determined locality of the venue.

In general, in one aspect, the invention relates to a computer readable medium, embodying instructions for using a multimedia service associated with a venue. The instructions are executable by the computer to obtain a pre-approved activation code associated with the venue, to activate the multimedia service associated with the venue using the pre-approved activation code and an identification of a multimedia device, to request the multimedia service using the multimedia device, and to receive the multimedia service using the multimedia device within a pre-determined range from a pre-determined locality of the venue, where the request is authenticated based on a locality of the multimedia device being within the pre-determined range from the pre-determined locality of the venue.

Other aspects and advantages of the invention will be apparent from the following description and the appended claims.

DETAILED DESCRIPTION

Figure 1:
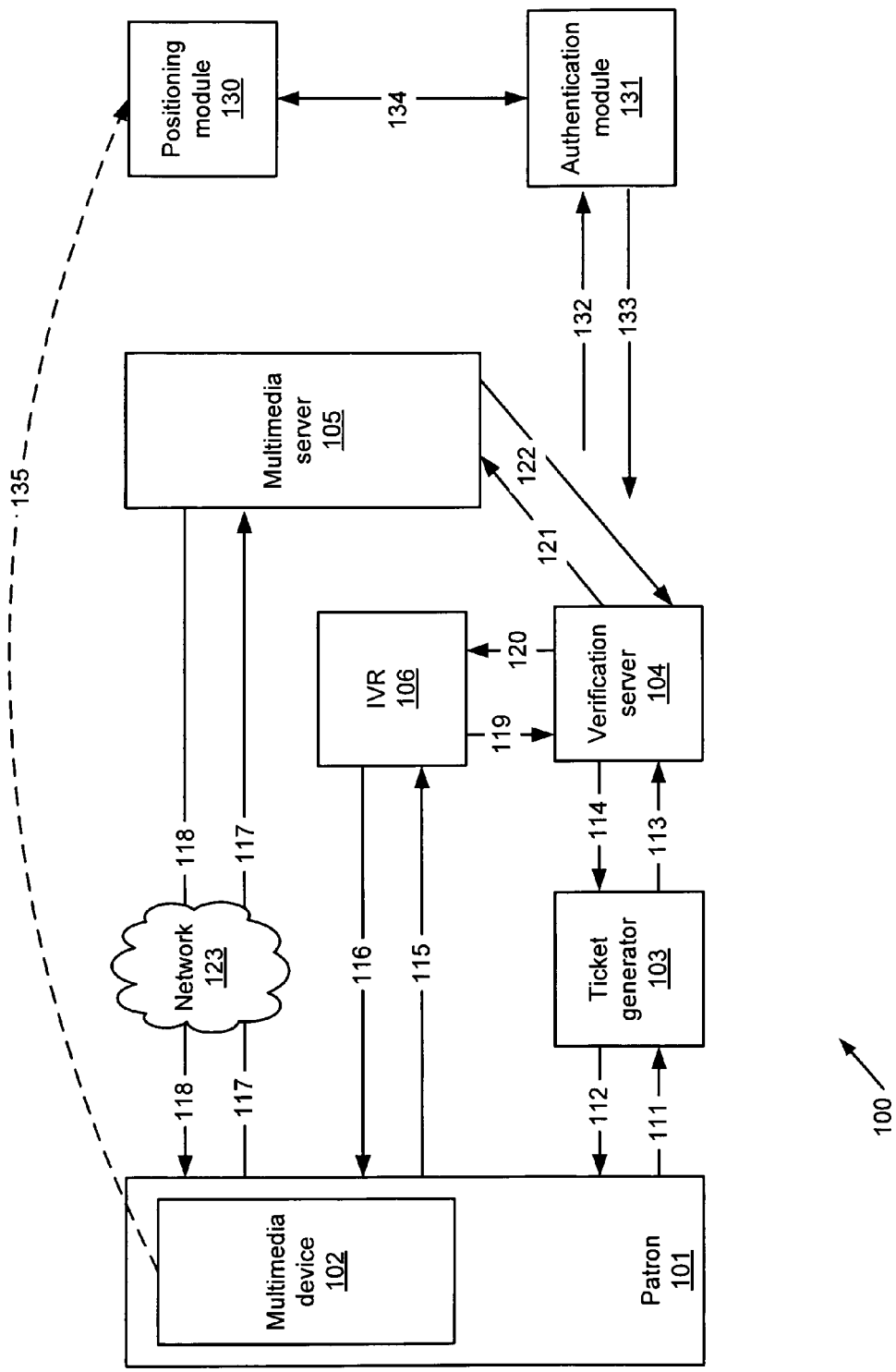
FIG. 1 shows an exemplary block diagram of providing multimedia service associated with a venue in accordance with aspects of the invention.

Specific embodiments of the invention will now be described in detail with reference to the accompanying figures. Like elements in the various figures are denoted by like reference numerals for consistency.

In examples of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, in one aspect, the invention relates to a system and method for providing functionality to allow an attendee of a venue, while still on site, to receive a multimedia service associated with the venue using a multimedia device for a short duration (in lieu of physically attending an event at the venue).

FIG. 1 shows an exemplary block diagram of a system (100) for providing multimedia service associated with a venue in accordance with aspects of the invention. In one or more embodiments of the invention, the block diagram shows an attendee (or patron) (101) of the venue (not shown), a multimedia device (102) (e.g., a mobile device (such as a cellular phone with audio or audio/video capability or a personal multimedia device with Wi-Fi, VoIP or other wireless capability), a stationary display monitor with a network connection and sound capability located on a bathroom stall or in an elevator, or other display devices) of the patron (101) for receiving the multimedia service (such as a video/audio streaming service), a ticket generator (103), a verification server (104), a multimedia server (e.g., a streaming server) (105), an activation interface (106), and a carrier network (e.g., a wireless carrier network, a landline phone carrier network, or other network capable of transmitting multimedia content) (123) subscribed by the attendee (or patron) (101) for the multimedia device (102). The multimedia device (102) may be brought with the patron to the venue or provided to the patron by the venue operator.

In one or more embodiments of the invention, portions of the system (100) are set up in different physical locations and operated by various different business entities. For example, the ticket generator (103) may be located at the venue location, an offsite location, or accessible online. Further, the activation interface (106) and the verification server (104) may be located in a back office of the venue operator or a third party data service center. The activation interface (106) may be a stand alone device or integrated within the verification server (104). The multimedia server (105) may be operated by a carrier network operator, the third party data service center, or the venue operator.

In one or more embodiments of the invention, the venue is any kind of event at a venue location, such as a motion picture at a movie theater, a concert at a concert hall, an opera at an opera house, a wedding at a wedding site, a trial at a court building, a conference at a conference center, a meeting at a meeting place, a sporting event at a stadium, a performance event at a performing center, or any other specific types of events at the event locations. In one or more embodiments of the invention, access to such a venue may be acquired (e.g., purchased) (111) by an attendee (or patron) (101) and/or may be authorized by a ticket (112) (e.g., a paper ticket, an electronic ticket, etc.) produced from the ticket generator (103).

In one or more embodiments of the invention, the authorized access is registered (113) with the verification server (104), which returns an access code (114) to the ticket generator (103) to be incorporated as a portion of the ticket (103). This access code (114) may include (e.g., by encoding) an identification of the venue (e.g., a movie code identifying the name of the movie and a section in the movie theater where the particular movie is presented), an expiration time/date, and information for using the multimedia service (118) associated with the venue. In one or more embodiments of the invention, the information for using the multimedia service (118) includes the access method to access the activation interface (106) and a pre-approved activation code as a proof of purchase. For example, the activation interface (106) may be an interactive voice response (IVR) system functionally coupled to the verification server (104). Alternatively, the activation interface (106) may be other kinds of networked interactive systems.

In one or more embodiments of the invention, the access method includes the telephone number and/or associated password for dialing the IVR system or otherwise accessing the other kinds of networked interactive systems. The patron (101) may activate the multimedia service (118) by providing activation information (115) to the activation interface (106). The activation interface (106) may be accessed using the multimedia device (102) (e.g., via the carrier network (123)) or a separate land-based telephone or other types of network devices.

In one or more embodiments of the invention, the activation information (115) includes the pre-approved activation code from the ticket (112). The activation information (115) may also include (e.g., by encoding) the identification of the requested venue, which is verified by the verification server (104) based on information registered (113) when the ticket (112) was previously acquired (111). Furthermore, an identifier (e.g., a telephone number or other unique identifier) associated with the multimedia device (102) may be provided to the activation interface (106) as part of activation information (115) in accordance with one or more embodiments of the invention. For example, the identification of the multimedia device (102) may be obtained by the activation interface (106) and/or the verification server (104) automatically. An electronic serial number (ESN) commonly used for cellular phone activation in wireless carrier networks or a cellular phone number known as the mobile identification number (MIN) may be captured automatically by the activation interface (106) from the carrier network used. Alternatively, the identification of the multimedia device (102) may be manually entered. Other information (e.g., credit card or debit card information of the patron (101)) may also be included in the activation information (115) for verification purposes based on various schemes known in the art (e.g., the cellular phone may connect to the credit card company and use transaction data to determine location and eligibility).

In one or more embodiments of the invention, the activation interface (106) presents (119) the activation information (115) to the verification server (104) and receive (120) either confirmation or denial of the activation request to be returned (116) to the patron (101). In one or more embodiments of the invention, the activation information (115) may be stored in the verification server (104) for verification (or auditing) purposes later. Further, the verification server (104) interacts with the ticket generator (103), the IVR (106), and the multimedia server (105) to ensure that the patron (101) may properly (i.e., is authorized to) receive requested multimedia content to the proper multimedia device (102).

Once the multimedia service activation is confirmed, the patron (101) may request (117) the multimedia service (118) using the multimedia device (102). In one example, the patron (101) may use a multimedia service provided by the carrier network (123) for submitting the request (117) to the multimedia server (105), in which case the multimedia server (105) may be operated by the network operator of the carrier network (123).

In one or more embodiments of the invention, the multimedia service is accessed through a special menu page or application in the multimedia device (102) with a pre-configured access to the multimedia server (105). Alternatively, the patron (101) may access a pre-determined webpage or dial a pre-configured phone number to access the multimedia server (105) for submitting the request (117).

Upon receiving the request (117), the multimedia server (105) may, in turn, determine the identification of the multimedia device (102) and communicate (122) the request (117) to the verification server (104) to obtain a verified identification (121) of the venue. The identification of the multimedia device (102) may be manually entered or automatically captured by the multimedia server (105) in the same way as the activation interface (106) described above. The request (117) may be optionally submitted with an identification of the requested venue (or the identification may be obtained using global positioning technology). Further, the request (117) may be correlated or compared with previously stored activation information (115) by the verification server (104) to determine the verified identification (121) of the venue.

In one or more embodiments of the invention, once the activation information (115) is verified by the verification server (104), the verified identification (121) of the venue associated with the identification of the multimedia device (102) may be transmitted to the multimedia server (105) in anticipation of an incoming request (117). In which case, the identification of the multimedia device (102) and the verified identification (121) of the venue may be stored in the multimedia server (105). For example, both the verification server (104) and the multimedia server (105) may be operated by the same business entity (e.g., the venue operator or the third party data service provider) and are functionally coupled through a pre-configured connection. Alternatively, the verification server (104) and the multimedia server (105) may be operated by different business entities based on a pre-arranged agreement. In which case the identification of the multimedia server (105) for providing the multimedia service (118) may be pre-configured in the verification server (104) or may be submitted as part of the activation information (115).

In addition to the request (117) being verified to obtain the verified identification (121) of the venue, the identification of the multimedia device (102) is authenticated (133) for receiving the multimedia service (118). For example, the authentication may be based on the multimedia device (102) remaining in the vicinity (e.g., within a pre-determined range) of the venue location. The locality of the multimedia device (102) may be determined by a positioning module (130), which may be a stand alone device or integrated within the multimedia server (105) or the verification server (104).

In one or more embodiments of the invention, the locality of the multimedia device (102) is provided by the multimedia device (102) as it accesses the activation interface (106) or the multimedia server (105) based on a global positioning system (GPS) incorporated inside the multimedia device (102). In one or more embodiments of the invention, the information from the GPS may be received by the positioning module (130) integrated within the verification server (104) or the multimedia server (105) or be forwarded to the stand alone positioning module (130) from the verification server (104) or the multimedia server (105). Alternatively, the locality of the multimedia device (102) may be determined by triangulation of wireless signals (135) from the multimedia device (102) based on functionalities configured in the positioning module (130). The positioning module (130) may communicate (134) with an authentication module (131), which performs the authentication by comparing the locality of the multimedia device (102) to the pre-determined range and a pre-determined venue locality. In one or more embodiments of the invention, the pre-determined range and the pre-determined venue locality is pre-configured in the authentication module (131) or obtained (132) from the verification server (104) or the multimedia server (105).

In one or more embodiments of the invention, authentication is further performed by the authentication module (131) based on statistics relating to the request (117), for example, whether the request (117) for the multimedia service (118) exceeds a total allowed number of times throughout the venue event or whether the multimedia service (118) has been previously requested within a minimum time separation allowed for repeated requests. Once authenticated, the multimedia server (105) may provide the multimedia service (118) via the patron subscribed carrier network (123) to the multimedia device (102). The multimedia server (105) may calculate the current position in the venue event based on a time when the request (118) is authenticated and starts the multimedia service (118) synchronized to the venue event. The multimedia service (118) may be provided for a limited time duration after the request (117) is authenticated. This may be accomplished in many different ways. For example, the multimedia server (105) may limit the duration of the multimedia service (118) based on a pre-determined length of time or a time-out command from the authentication module (131).

Figure 2:
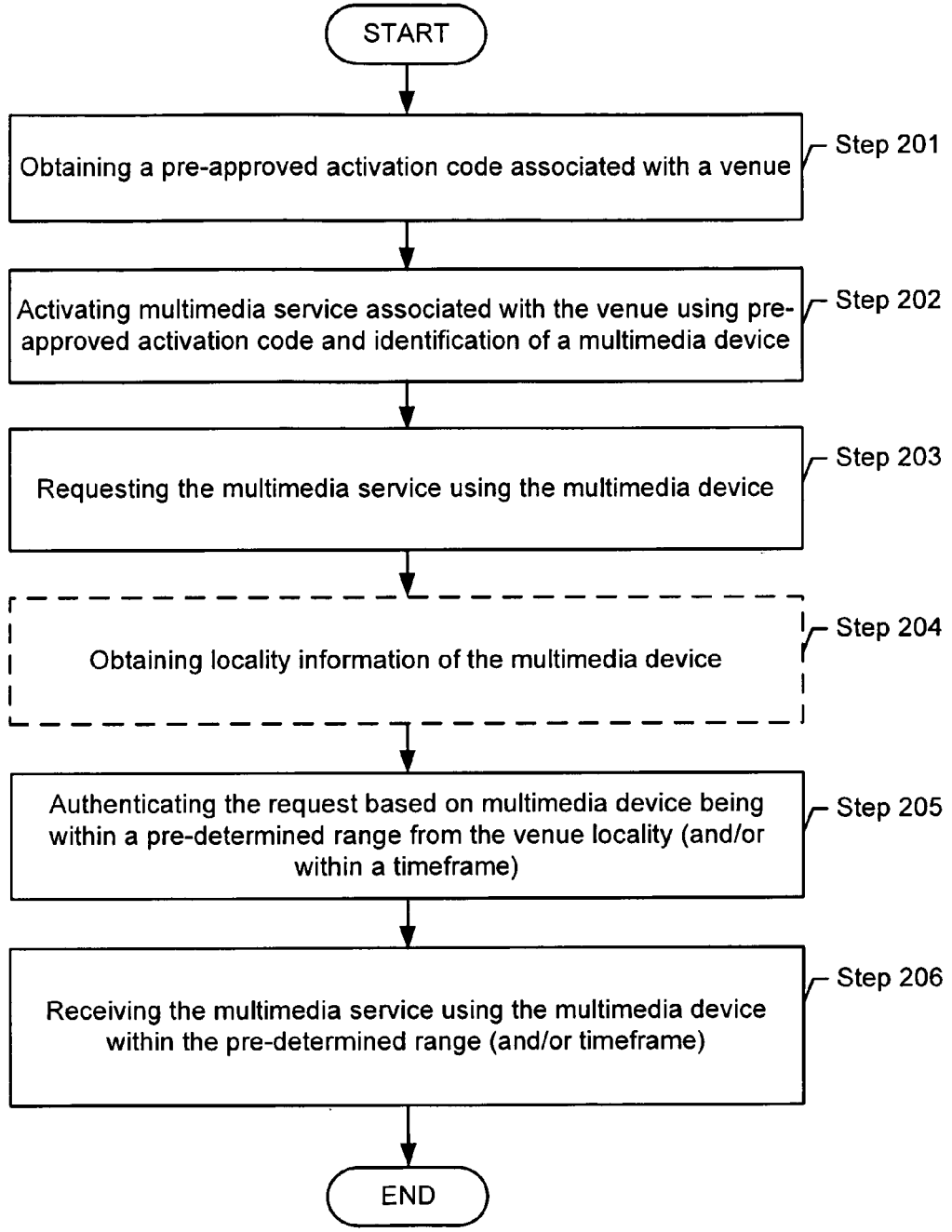
FIG. 2 shows a flow chart of a method in accordance with aspects of the invention.

FIG. 2 shows a flow chart of a method in accordance with aspects of the invention. Initially, a pre-approved activation code associated with a venue may be obtained (Step 201) in accordance with one or more embodiments of the invention. The pre-approved activation code may be obtained as a proof of purchase from a verification server (104) of FIG. 1.

In one or more embodiments of the invention, the venue is provided with a multimedia service, which may be activated using a multimedia device with the pre-approved activation code (Step 202). For example, the activation may be performed by the authentication module (131) in conjunction with the verification server (104) of FIG. 1.

In one or more embodiments of the invention, the activated multimedia device may be identified by a telephone number of a mobile device or electronic serial number (ESN) of a multimedia device. The multimedia service may then be requested using the multimedia device (Step 203). For example, the request may be submitted to a multimedia server (105) through a special page or application configured in the multimedia device or by dialing a preconfigured telephone number to access the multimedia server (105), as shown in FIG. 1. Further, the request may be authenticated based on a positioning module (130) of FIG. 1, which may obtain the locality of the multimedia device (Step 204).

In one or more embodiments of the invention, the request is then authenticated based on the multimedia device being within a pre-determined range from the venue locality (and/or within a pre-determined timeframe) (Step 205). Once the request is authenticated, the multimedia service may then be received by the multimedia device as long as the multimedia device remains within the pre-determined range from the venue location and/or within a pre-determined time frame (Step 206) in accordance with one or more embodiments of the invention.

Figure 3:
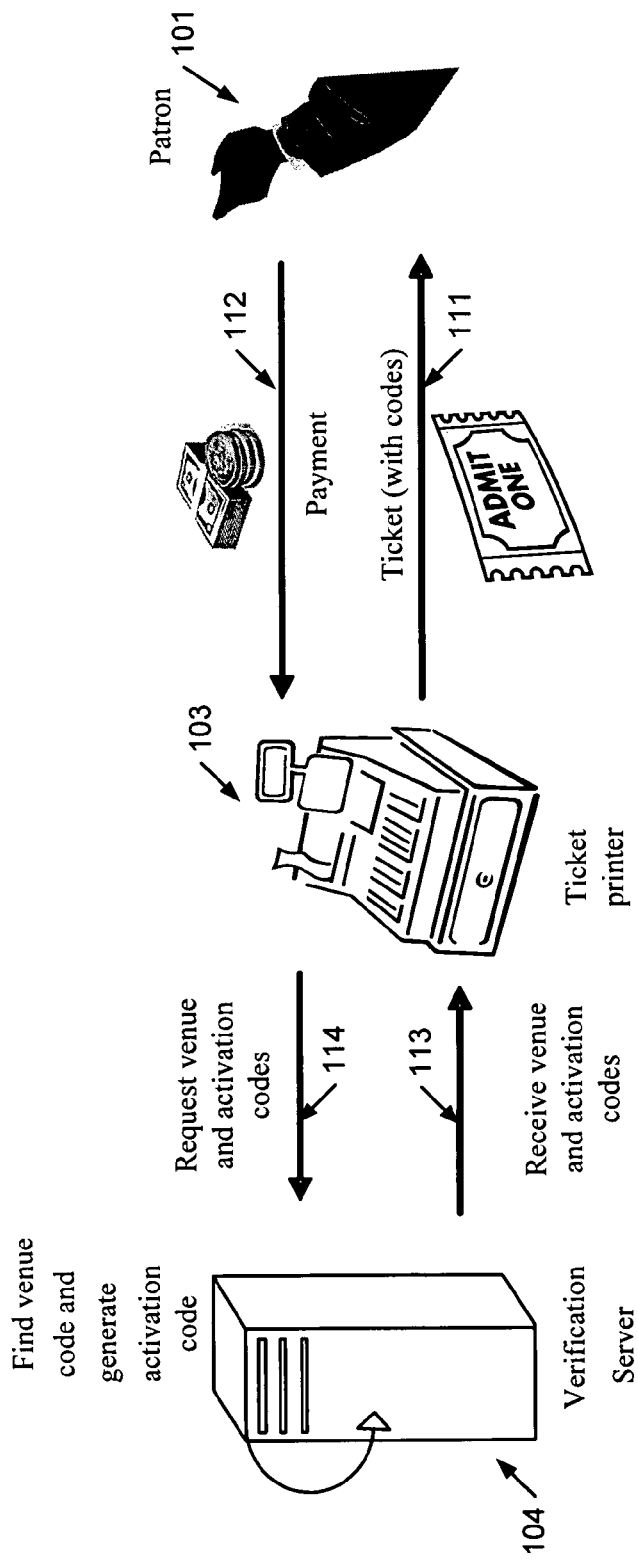
FIG. 3 shows an example of obtaining access authorization to the venue in accordance with aspects of the invention
Figure 4:
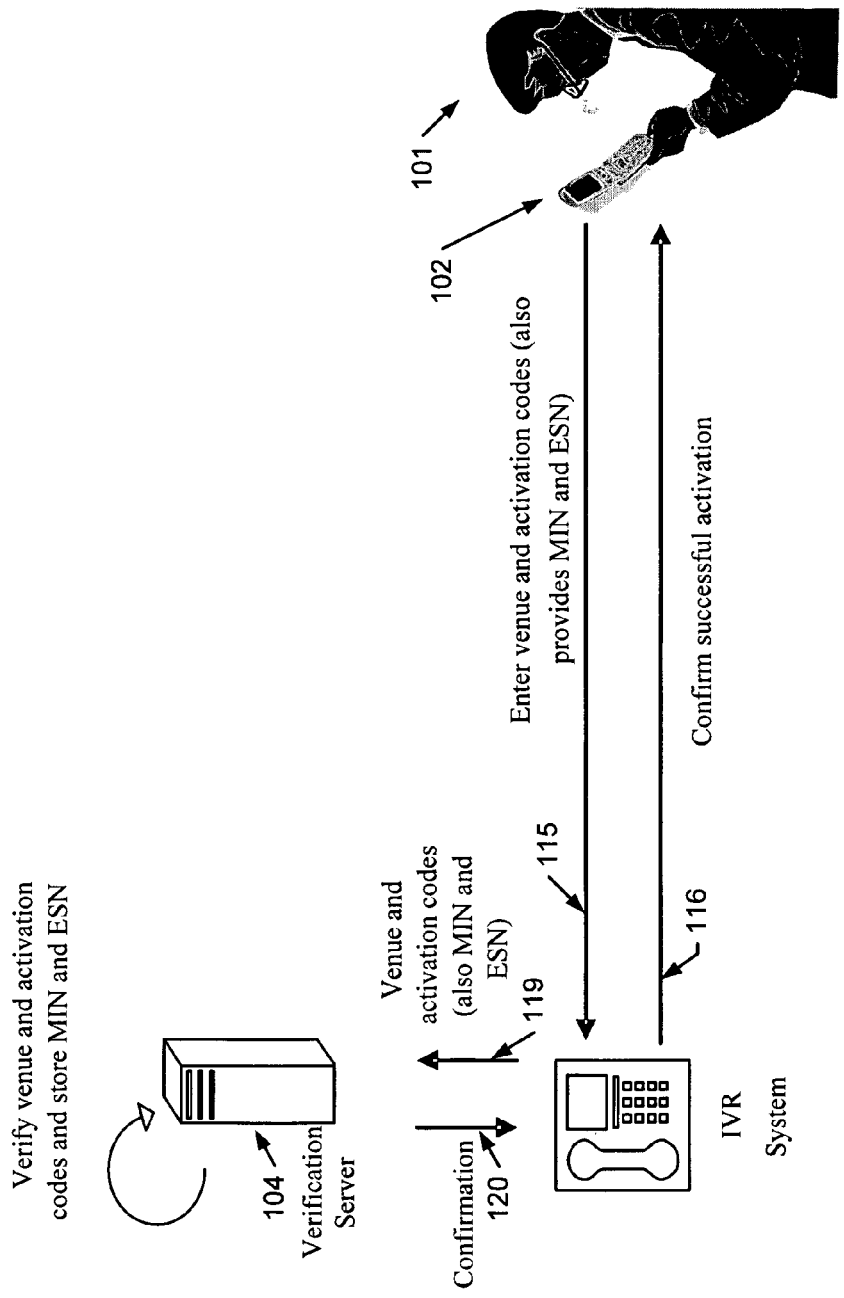
FIG. 4 shows an example of activating the multimedia service associated with the venue in accordance with aspects of the invention.
Figure 5:
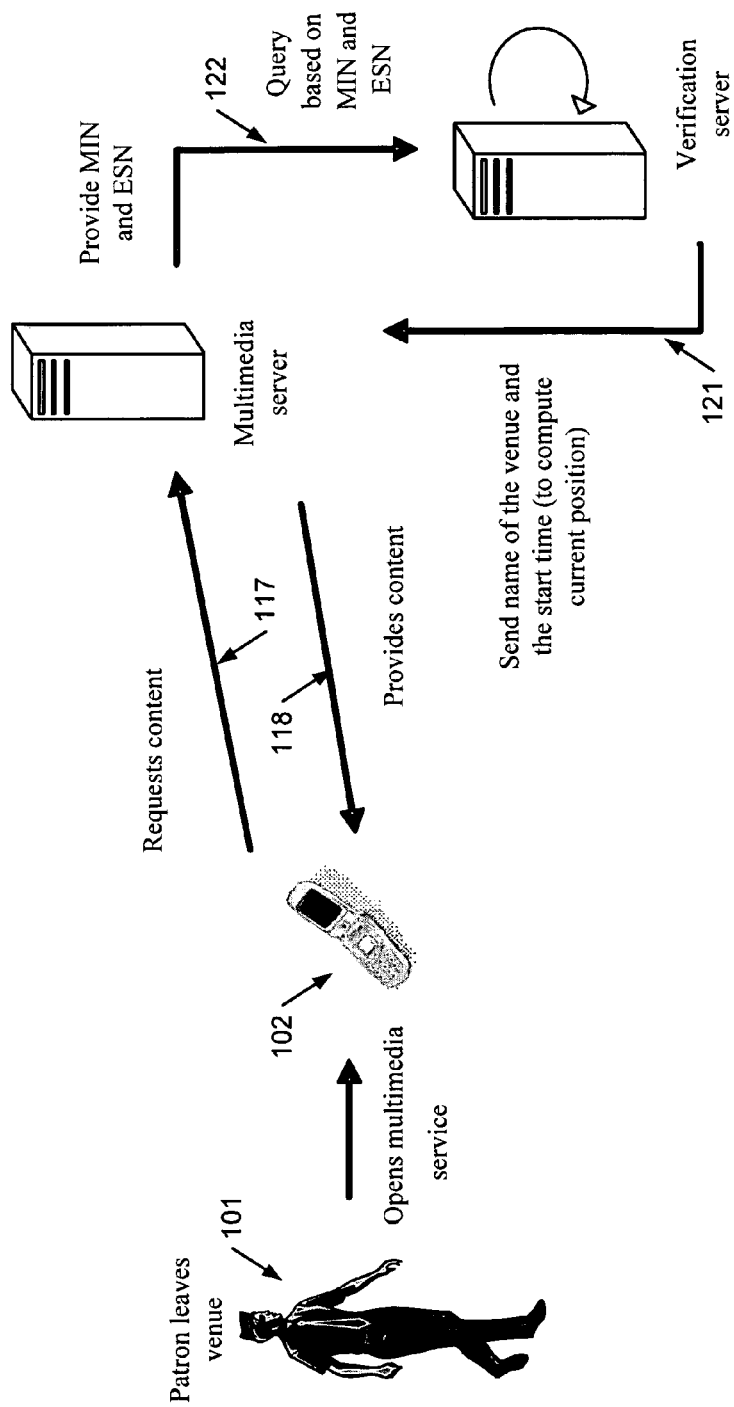
FIG. 5 shows an example of using the multimedia service in accordance with aspects of the invention.
Figure 6:
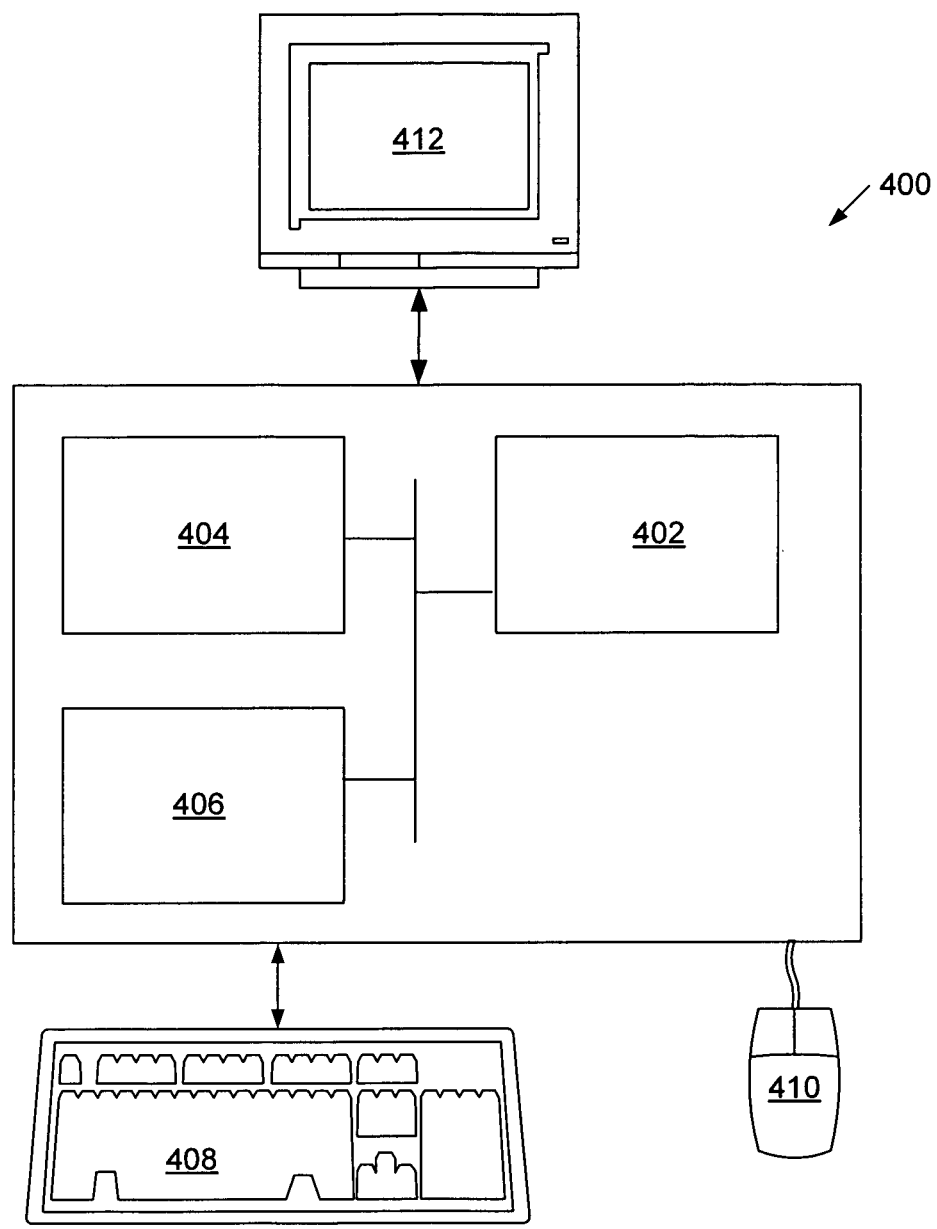
FIG. 6 shows a computer system in accordance with an embodiment of the invention.

FIGS. 3-5 depict an example of a patron attending a movie theater venue based on the system (100) of FIG. 1. In summary, the method includes authenticating a movie theater patron as someone who can view the film (i.e., the event) shown at the movie theater (i.e., the venue), establishing a connection between a personal multimedia device of the patron and a streaming multimedia server, and streaming an audio and/or video portion of the film for a specific period of time.

FIG. 3 shows an example of obtaining access authorization to the venue in accordance with one or more embodiments of the invention. Various elements shown in FIG. 3 are essentially the same as those elements shown in FIG. 1 and are referenced using same reference designators.

When the ticket (111) is purchased (112) by the patron (101), the ticket generator (e.g., a ticket printer) (103) includes functionality to request (114) both a movie code and a pre-approved activation code from the verification server (104) based on the venue selected by the patron (101). The verification server (104) includes functionality to return (113) both the movie code corresponding to the venue and a pre-approved activation code unique to the purchase. The ticket printer (103) also includes functionality to print the code information onto the ticket (111). For example, the ticket could have a barcode, which when read by the multimedia device (or a device, such as a barcode reader) attached to the device. In addition, in this example, the phone number and associated password (if any) for access the IVR system is also printed on the ticket (111).

FIG. 4 shows an example of activating the multimedia service associated with the venue in accordance with one or more embodiments of the invention. Here, the patron (101) dials into the IVR system (106) and enters the movie code and the pre-approved activation code. The IVR system (106) includes functionality to communicate with the verification server (104) to verify that the codes are valid and either denies or confirms the activation. In this example, the MIN and/or the ESN of the multimedia device (102) are also stored when the patron (101) dials in.

FIG. 5 shows an example of using the multimedia service in accordance with one or more embodiments of the invention. In this example, the multimedia server (104) is operated by the carrier network provider that provides cellular phone service to the multimedia device (102) (e.g., a mobile phone) for the patron (101). Upon leaving the event temporarily, the patron (101) activates the multimedia service pre-configured on the multimedia device (102), such as a cellular phone, by the carrier network provider. Alternatively, the patron (101) may activate the multimedia service by accessing the pre-determined webpage or make a phone call to the pre-configured phone number assigned by the carrier network provider.

Next, the request (117) may be submitted to the multimedia server (105). The multimedia server (105) then provides the MIN and/or the ESN of its customer (i.e., the patron (101)) to the verification server (104), which may be operated by the movie theater or its contracted third party data service center. The verification server (105) includes functionality to execute a query based on this information and determines which movie (and at what start time) the patron (101) is allowed to view. In addition, the multimedia server (105) may include a positioning module to determine the location of the cellular phone (e.g. based on information from a GPS incorporated in the cellular phone or multi-cell triangulation using the wireless carrier network). The locality of the cellular phone may then be transmitted to an authentication module integrated within the verification server (104) to verify that the patron (101) is, in fact, inside the movie theater or within a pre-determined range from the movie theater.

The multimedia server may also include functionality to calculate the current spot in the movie (with a small margin of extra content provided for the time necessary to activate the service) and starts streaming (118) the content. The patron may also be allowed to control the streaming content to a limited degree (rewind and/or fast-forward within a 30 second span) to assure the patron has not missed the relevant portions of the movie. The multimedia server times out after a pre-determined amount of time (e.g., 10 minutes) or discontinues service if the multimedia device (102) is deemed as out of the predetermined range. The location of the multimedia device (102) may be continuously monitored by the multimedia server (e.g., every 10 seconds).

When the movie is finished, the authentication module may simply reject any request (117) submitted by the patron (101) based on the determination (e.g., using current time, start time, and movie length) that the movie is finished. Furthermore, the authentication module may also disallow any request (117) that is "too close" together or repeated "too many times" during the movie to prevent unauthorized use, for example the patron (101) providing information related to the access code (114) to someone else by providing the ticket (111) or the access code (114) information.

The example depicted in FIGS. 3-5 may also apply to another similar scenario where the patron is touring an exhibit (e.g., a museum exhibit). The multimedia device (102) may be used for illustrating the exhibit as the patron follows the tour. In one or more embodiments of the invention, the multimedia content may be stream to the multimedia device throughout the tour instead of only being activated when the patron leaves the exhibit event temporarily.

Although the examples given above use a cellular phone as the multimedia device for receiving multimedia service of a motion picture, other mobile or stationery multimedia devices may also be used without deviating from the spirit of the invention, such as a personal digital assistant (PDA), handheld gaming device, or a monitor attached to the back of a bathroom stall door where the patron may type in a code to view the movie. Alternatively, the monitor attached to the back of the stall may include a barcode reader to read the barcode printed on a ticket. In addition, the wireless carrier network of a cellular service provider may be supplemented, replaced, or otherwise substituted by WiFi network, VoIP network or other suitable data connection for multimedia transmission. For example, the IVR system may be substituted by Internet access capability configured in the cellular phone, in which case IP address and MAC address of the Internet-ready cellular phone may replace MIN and ESN. Furthermore, other add-on service contents may also be provided, such as movie previews sent to the patron's cellular phone later based on what movie he/she saw at the theater and viewed on his/her multimedia device. Advertisement may also be presented along with the multimedia service or the add-on service contents.

The invention or a portion thereof may be implemented on virtually any type of computer regardless of the platform being used. Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., positioning module, authentication module, ticket generator, etc., or any combinations thereof) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. A method for using multimedia service presented at a venue event, comprising:
   obtaining a pre-approved activation code associated with the venue event;
   activating the multimedia service using the pre-approved activation code and a cellular phone number of a cellular phone; sending, using the cellular phone, an initial request for a first portion of the multimedia service synchronized to the venue event for a pre-determined length of time less than a total time of the venue event, wherein the initial request is authenticated by a verification server based on the cellular phone number and a locality of the cellular phone being within a pre-determined range from a pre-determined locality of the venue event; start receiving, in response to the initial request being authenticated, the first portion of the multimedia service using the cellular phone for the pre-determined length of time and within the pre-determined range from the pre-determined locality of the venue, wherein the receiving of the first portion of the multimedia service is synchronized to a calculated current time position in the venue event based on a time when the initial request is authenticated; stop receiving the first portion of the multimedia service at an end of the pre-determined length of time;
   sending, using the cellular phone prior to an end of the venue event and within a pre-determined time interval subsequent to sending the initial request, a subsequent request for a second portion of the multimedia service synchronized to the venue event;
   and receiving a first rejection of the subsequent request.

2. The method of claim 1, further comprising:
   wherein the verification server authenticates the initial request to a multimedia server,
   wherein the multimedia server provides the first portion of the multimedia service to the cellular phone.

3. The method of claim 1, further comprising:
   sending, using the cellular phone prior to the end of the venue event, a further subsequent request for a third portion of the multimedia service synchronized to the venue event; and
   receiving a second rejection of the further subsequent request in response to the further subsequent request exceeding a pre-determined total number of allowed multimedia service requests.

4. The method of claim 1,
   wherein the locality of the cellular phone is determined automatically by at least one selected from a group consisting of a global positioning device and triangulation of wireless signal from the cellular phone.

5. A method for authenticating a request for multimedia service presented at a venue event, comprising: activating the multimedia service using a pre-approved activation code associated with the venue event and an electronic serial number of a cellular phone; receiving, from the cellular phone, an initial request for a first portion of the multimedia service synchronized to the venue event for a pre-determined length of time less than a total time of the venue event; obtaining locality of the cellular phone; authenticating, by a verification server, the initial request based on the electronic serial number and the locality of the cellular phone being within a pre-determined range from a pre-determined locality of the venue event; starting, in response to the initial request being authenticated, transmission of the first portion of the multimedia service to the cellular phone for the pre-determined length of time and within the pre-determined range from the pre-determined locality of the venue event, wherein the transmission of the first portion of the multimedia service is synchronized to a calculated current time position in the venue event based on a time when the initial request is authenticated; discontinuing transmission of the first portion of the multimedia service to the cellular phone at an end of the pre-determined length of time; receiving, from the cellular phone prior to an end of the venue event and within a pre-determined time interval subsequent to receiving the initial request, a subsequent request for a second portion of the multimedia service synchronized to the venue event; and rejecting the subsequent request.

6. The method of claim 5,
   wherein the verification server authenticates the initial request to a multimedia server,
   wherein the multimedia server provides, in response to the initial request being authenticated, the first portion of the multimedia service to the cellular phone.

7. The method of claim 5, further comprising:
   receiving, from the cellular phone prior to the end of the venue event, a further subsequent request for a third portion of the multimedia service synchronized to the venue event; and
   rejecting the further subsequent request in response to the further subsequent request exceeding a pre-determined total number of allowed multimedia service requests.

8. The method of claim 5,
wherein the locality of the cellular phone is determined automatically by at least one selected from a group consisting of a global positioning device and triangulation of wireless signal from the cellular phone.

9. A system for authenticating a request for multimedia service presented at a venue event, comprising:
- a cellular phone for requesting and receiving the multimedia service;
- a positioning module configured to determine a locality of the cellular phone; and
- a verification server configured to:
  - authenticate, based on a cellular phone number of the cellular phone and the locality of the cellular phone being within a pre-determined range from a pre-determined locality of the venue event, an initial request from the cellular phone for a first portion of the multimedia service synchronized to the venue event for a pre-determined length of time less than a total time of the venue event;
  - approve, in response to the initial request being authenticated, transmission of the first portion of the multimedia service to the cellular phone for the pre-determined length of time and within the pre-determined range from the pre-determined locality of the venue event, wherein the transmission of the first portion of the multimedia service is synchronized to a calculated current time position in the venue event based on a time when the initial request is authenticated, wherein the transmission of the first portion of the multimedia service is discontinued at an end of the pre-determined length of time; and
  - reject a subsequent request for a second portion of the multimedia service synchronized to the venue event based on the subsequent request being received prior to an end of the venue event and within a pre-determined time interval subsequent to receiving the initial request.

10. The system of claim 9, further comprising:
a multimedia server configured to:
- obtain an approval from the verification server;
- start, in response to obtaining the approval, transmission of the first portion of the multimedia service to the cellular phone for the pre-determined length of time; and
- discontinue transmission of the first portion of the multimedia service to the cellular phone at the end of the pre-determined length of time.

11. The system of claim 9, wherein the verification server is further configured to:
- receive, from the cellular phone prior to the end of the venue event, a further subsequent request for a third portion of the multimedia service synchronized to the venue event; and
- reject the further subsequent request in response to the further subsequent request exceeding a pre-determined total number of allowed multimedia service requests.

12. The system of claim 9,
wherein the locality of the cellular phone is determined automatically by the positioning module using at least one selected from a group consisting of a global positioning device and triangulation of wireless signal from the cellular phone.

13. A non-transitory computer readable medium, embodying instructions for using multimedia service presented at a venue event, wherein the instructions are executable by a computer processor to: obtain a pre-approved activation code associated with the venue event; activate the multimedia service using the pre-approved activation code and a cellular phone number of a cellular phone; send, using the cellular phone, an initial request for a first portion of the multimedia service synchronized to the venue event for a pre-determined length of time less than a total time of the venue event, wherein the initial request is authenticated by a verification server based on the cellular phone number and a locality of the cellular phone being within a pre-determined range from a pre-determined locality of the venue event; start receiving, in response to the initial request being authenticated, the first portion of the multimedia service using the cellular phone for the pre-determined length of time and within the pre-determined range from a pre-determined locality of the venue, wherein the receiving of the first portion of the multimedia service is synchronized to a calculated current time position in the venue event based on a time when the initial request is authenticated; stop receiving the first portion of the multimedia service at an end of the pre-determined length of time; send, using the cellular phone prior to an end of the venue event and within a pre-determined time interval subsequent to sending the initial request, a subsequent request for a second portion of the multimedia service synchronized to the venue event; and receive a rejection of the subsequent request.

* * * * *